United States Patent
Froissard et al.

(10) Patent No.: US 7,955,657 B2
(45) Date of Patent: Jun. 7, 2011

(54) AQUEOUS COMPOSITION FOR MAKING COATING SOLUTIONS FOR PRODUCING SUPPORTS ENDOWED WITH ANTI-BLOCKING PROPERTIES, METHOD FOR MAKING SUCH SUPPORTS AND RESULTING SUPPORTS

(75) Inventors: Frederic Froissard, Veyre Monton (FR); Herve Soulaioux, Aurieres (FR)

(73) Assignee: CGP Industries, Cebazat (FR)

( * ) Notice: Subject to any disclaimer, the term of this patent is extended or adjusted under 35 U.S.C. 154(b) by 349 days.

(21) Appl. No.: 12/088,820

(22) PCT Filed: Sep. 29, 2006

(86) PCT No.: PCT/FR2006/050960
§ 371 (c)(1),
(2), (4) Date: Mar. 31, 2008

(87) PCT Pub. No.: WO2007/042697
PCT Pub. Date: Apr. 19, 2007

(65) Prior Publication Data
US 2008/0254222 A1    Oct. 16, 2008

(30) Foreign Application Priority Data
Oct. 7, 2005   (FR) .................................. 05 53057

(51) Int. Cl.
*B05D 3/02*        (2006.01)
(52) U.S. Cl. .................. 427/385.5; 427/389.9; 427/391; 427/392; 427/394; 427/395; 427/396

(58) Field of Classification Search ........................ None
See application file for complete search history.

(56) References Cited

U.S. PATENT DOCUMENTS

| 3,615,972 | A | | 10/1971 | Morehouse, Jr. et al. |
| 4,287,308 | A | | 9/1981 | Nakayama et al. |
| 5,360,826 | A | * | 11/1994 | Egolf et al. ............... 521/54 |
| 6,444,134 | B1 | * | 9/2002 | Holman et al. ............ 216/29 |

FOREIGN PATENT DOCUMENTS

| EP | 0653475 | 5/1995 |
| EP | 1039025 | 9/2000 |
| FR | 2673209 | 8/1992 |
| JP | 06264002 | 9/1994 |
| JP | 07304999 | 11/1995 |

OTHER PUBLICATIONS

Abstracts and partial machine translation of JP 09-104798, Apr. 1997.*
International Search Report PCT/FR2006/050960 Dated Feb. 9, 2007.

* cited by examiner

*Primary Examiner* — Erma Cameron
(74) *Attorney, Agent, or Firm* — Heslin Rothenberg Farley & Mesiti P.C.

(57) ABSTRACT

This aqueous composition for coating supports to provide same with anti-blocking properties, comprises:
- 50 to 99 parts of a binding polymer;
- 1 to 50 parts of expansible microspheres, The binding polymer is a copolymer having at least one crosslinkable function.

13 Claims, 2 Drawing Sheets

*Butadiène = butadiene*
*Polymérisation en émulsion – Emulsion polymerization*

*Butadiène = butadiene*

*Polymérisation en émulsion – Emulsion polymerization*

*Right: Crosslinking by acidic condensation under the action of heat.
Removal of water and formaldehyde*

AQUEOUS COMPOSITION FOR MAKING COATING SOLUTIONS FOR PRODUCING SUPPORTS ENDOWED WITH ANTI-BLOCKING PROPERTIES, METHOD FOR MAKING SUCH SUPPORTS AND RESULTING SUPPORTS

FIELD OF THE INVENTION

The present invention relates to a novel aqueous composition for coating solutions, for producing anti-blocking supports. The use of such a composition serves to eliminate the risk of sticking between supports coated on both sides, this sticking mechanism being better known in the technical field concerned by the expression "blocking".

In the context of the present invention, blocking properties means properties developed by certain supports, such as in particular papers, cardboards, films, non-woven materials, which, although devoid of glue or any other similar adhesive system, have a certain resistance to movement when, being positioned flat on any lining, they are subject to a displacement on or parallel to this lining. These properties are generally necessary when the supports are positioned on smooth linings.

PRIOR ART

It has been known how to manufacture anti-blocking supports for more than 10 years. These products are obtained by various coating processes, spraying, or directly on a size press on a papermaking machine.

The compounds used for obtaining these products consist of:
  either paraffins having a tacky effect, to which are added printing and/or coating products formulated with colloidal silicas, fillers;
  or latex formulated with:
    colloidal silicas (described for example in document JP 96127627),
    microspheres which expand under the action of heat (described for example in document FR 2 673 209).

Only the coating process combining latex with expansible microspheres serves to obtain anti-blocking supports having a satisfactory effect (evaluated by measuring the coefficient of friction (COF), which must be higher than 45°), without depositing any residue on the container contacted with the insert.

In this configuration, the coating solution used contains either an emulsion copolymer, or a mixture of polymers and/or copolymers having a wet glass transition temperature (Tg) lower than 35° C.

This parameter appears to be essential because for a higher glass transition temperature Tg, the polymer film obtained after drying is too hard. The layer then becomes brittle, causing a loss of properties of the final product. Furthermore, the microspheres cannot expand optimally. On the other hand, a glass transition temperature Tg close to 35° C. or less makes the layer sufficiently soft to ensure good dispersion and good expansion of the microspheres. However, this composition only allows the use of the coating solution in non-papermaking machine coating processes, and not in size-press type processes.

However, the use of latex or a mixture of latex having a Tg <35° C. has a major drawback: blocking. Blocking corresponds to an undesirable adhesion which occurs between two coated anti-blocking supports.

In fact, and in practice, the anti-blocking inserts prepared from paper or cardboard, corrugated or not, have the application (among others) of playing the role of palletizing inserts. There are packaged on pallets, in batches of formats. The large number of formats, the weight of the inserts, the stacking of the pallets, apply a high pressure to the sheets positioned at the bottom of the package. This applied pressure can cause sticking of the formats positioned on the bottom of the pallet, and thereby prevent any gripping of the sheets, a process aggravated and/or caused by severe storage conditions (temperature and humidity).

Blocking can be explained by two independent and/or complementary mechanisms:
  interdiffusion of the facing layers under the action of the pressure and/or temperature due to the low glass transition temperature Tg;
  the creation of a chemical bond following undesirable reactions between the two layers. These reactions are generally associated with the aging of the polymers by chain splitting and the creation of free radicals catalyzed by more or less severe storage conditions (humidity, temperature, light, etc.).

Solutions have been proposed to try to eradicate this problem:

It was first proposed to add inorganic and/or organic fillers, crosslinking agents, glass transition temperature Tg modifiers, paraffins, waxes, starch, which can help to attenuate the mechanism but without eliminating it. Furthermore, the addition of these compounds to the formulation may have detrimental effects on the coated layer, such as coating heterogeneity, migration of components, loss of intrinsic properties of the layer, increase in the coefficient of friction, etc.

It is also possible to overcome the blocking problem by using an insert preventing contact between the two coatings. However, this method has many drawbacks, for example in terms of machinability, product cost, processing of the semi-finished product, or use of the finished product.

SUMMARY OF THE INVENTION

Figure 1:
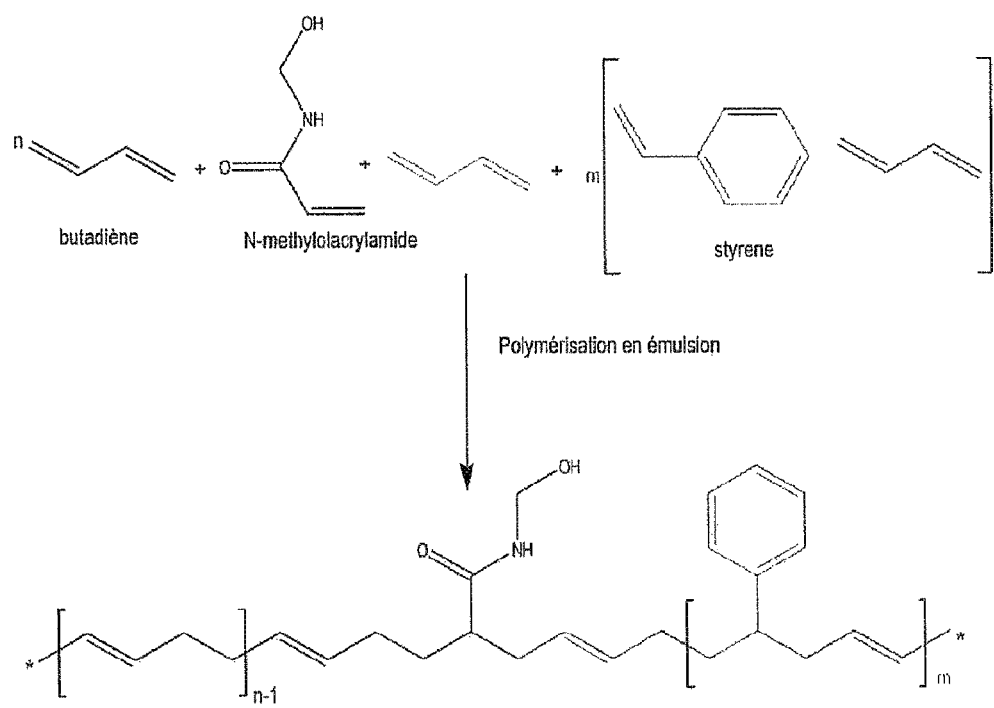
FIG. 1—Reaction mechanism for the synthesis of a latex, incorporating the comonomer N-methylolacrylamide (NMA).

The technical problem that the present invention proposes to solve is therefore to provide a formulation containing as few ingredients as possible and which serves to produce anti-blocking supports free of blocking problems.

According to a first aspect, the invention relates to an aqueous composition comprising 50 to 99 parts of a binding polymer and 1 to 50 parts of expansible microspheres, a composition different from those described in the prior art in that the binding polymer is a copolymer having at least one crosslinking function, thereby treating the binder as a thermoset polymer.

Such a composition, after coating on a support, serves both to totally remedy the problem of blocking, while providing the said support with good anti-blocking properties (COF >45°) and eliminating the undesirable effects potentially associated with additional components present in the composition.

In a manner known per se, the microspheres are small hollow particles containing a gas that expands under the action of heat. They have a diameter of about 10 μm, which may reach 40 μm after expansion. These particles are synthesized from various monomers, such as vinylidene chloride or acrylonitrile. The expanded particles are then completely impervious to gases. The choice of these microspheres is made so that their expansion initiation temperature is lower than the crosslinking temperature of the binding polymer, generally between 70° C. and 120° C.

The fabrication of these microspheres is described in greater detail in documents U.S. Pat. No. 4,287,308 and U.S. Pat. No. 3,615,972.

The proportion between microspheres and the binding polymer in the aqueous composition is expressed in parts, corresponding to parts by weight of the various ingredients in the composition.

The invention resides more particularly in the choice of the binding polymer used in the coating composition.

This is a copolymer, that is, resulting from the polymerization between at least two monomers of different types. It is further characterized by the fact that this copolymer, and therefore at least one of its constituent monomers, has at least one crosslinkable function.

In the context of the present invention, "crosslinkable function" means a chemical group carried by a chain of polymers or copolymers, suitable for establishing intermolecular covalent bonds in adequate conditions (temperature, pH, etc.). These functional groups are introduced into the copolymer via a comonomer. A binder is thereby obtained, whereof the particles are modified at the surface.

Without being bound by any theory whatsoever, a copolymer thus functionalized is capable of crosslinking with other polymer chains and thereby creating a network. This three-dimensional network avoids the mechanism of interdiffusion and the undesirable reactions causing the sticking between the coated layers, and hence the blocking.

A large number of latexes involving structured or unstructured copolymers yield good results in terms, for example, of processability and coating binder. However, as already mentioned, only those having a glass transition temperature Tg <35° C., preferably between −10° C. and 30° C., are sufficiently flexible to obtain proper expansion of the microspheres.

In order to have a good uniformity of deposition and thereby facilitate the expansion of the microspheres, it is necessary to have a binder with elastomeric properties. Advantageously and according to the invention, the binding copolymer, functionalized using a crosslinkable function, further comprises at least one elastomeric phase or block.

The most appropriate latexes are, for example, those obtained by copolymerization of monomers of the family of styrenics, acrylics (methacrylics), dienics or ethylenics.

Monomers advantageously used for obtaining copolymers in the context of the invention are listed in Table 1, which is non-limiting:

TABLE 1

| Monomer | Tg |
|---|---|
| Ethylene | −125 |
| Methyl methacrylate | 105 |
| Butyl methacrylate | 65 |
| Butyl acrylate | −54 |
| Styrene | 100 |
| Ethyl Hexylacrylate | −50 |
| Acrylic acid | 106 |
| Methacrylic acid | 228 |
| Hydroxyethyl acrylate | −15 |

TABLE 1-continued

| Monomer | Tg |
|---|---|
| Hydroxyethyl methacrylate | 55 |
| Butadiene | −78 |
| Vinyl acetate | 30 |
| Acrylonitrile | 130 |

Furthermore, the monomers carrying crosslinkable functions, advantageously of the amino-alcohol type, for example N-methylol, are incorporated in the copolymer.

Advantageously, the copolymer is a terpolymer involving three blocks. The structure of the particles consists of a polymeric phase (comprising monomers of the styrene, acrylic type, etc.) and an elastomeric phase (comprising monomers of the butadiene, acrylate type, etc.), functionalized at the surface by amino-alcohol groups. These groups have the property of reacting together by condensation induced by heat and of creating an irreversible three-dimensional network eliminating the mechanism of blocking.

In practice, the latexes are commonly synthesized by emulsion polymerization by a free-radical mechanism. The reaction is initiated by a thermal initiator, such as peroxide (sodium persulphate) or an azo derivative (azobisisobutyronitrile). Polymerization continues in a regulated thermal cycle, easily controllable due to the heterogeneity of the system.

The most commonly used monomers are: styrene, butadiene, acrylics (acrylonitrile, acrylic acid, methacylic acid, n-butyl acrylate, etc.), vinyls (vinyl acetate). The glass transition temperature Tg of these copolymers is usually between −30 and +30° C.

Other comonomers can be added to the system to provide other effects and properties to the final latex:

unsaturated acid, acrylic, itaconic acid. These charge the latex surface negatively, thereby stabilizing the dispersion;

acrylic ester (such as methylmethacrylate) or comonomers reacting to heat such as acrylamides which are used to cause the crosslinkage of the latex film under the action of heat.

Typically and according to the invention, the binder consists of a carboxylated SBR (styrene-butadiene) terpolymer (for example), functionalized following an operation during the synthesis of a comonomer of the acrylamide family. Its glass transition temperature Tg is between −30 and 30° C.

By way of illustration, the reaction mechanism for the synthesis of a latex, incorporating the comonomer N-methylolacrylamide (NMA), is presented (see FIG. 1). The terpolymer of the aqueous composition according to the invention is obtained in this case by polymerization of butadiene, styrene and NMA. This reaction mechanism is provided as an example. The comonomer may be modified according to the desired physicochemical properties. It is possible to vary the length of the carbon chain, the styrene and butadiene composition of the copolymer, the structure of the acrylamide group. The structure of the acrylamide group may vary in the number of carbon atoms, the alcohol functions present on the nitrogen atom (position N,N—N', etc.), capable of yielding primary, secondary or tertiary amides.

The acrylamide function reacts with the double bonds of the butadiene and introduces into the copolymer the N-methylol function, which remains as such in the latex synthesis conditions.

This functionalization serves both to:
- prepare a heat-sensitive binder which causes post-crosslinking after the creation of the film,
- stabilize the latex (by decreasing the quantity of surfactants in the system).

It should be noted that, in addition to the preparation of a heat-sensitive latex, the alcohol function introduced on the copolymer serves to improve its stability in the emulsion. This system, which has a higher stability, proves to be highly advantageous for its use on an industrial facility, and serves to reduce (or eliminate) the surfactants to be added to the composition. In fact, these surfactants are dispersed in the layer during the drying of the latex and are liable to migrate and/or interact. Thus, the presence of surfactants alters the properties of the film and the substrate/film cohesion.

The invention therefore serves to modify the surface of the latex by a small quantity of functional groups (acrylamide here) which help to increase the adhesion and the reactions between chains of polymers in the latex film.

Various additives may further be added to an aqueous composition according to the invention:
- co-binders, such as PVOH or CMC, and/or;
- optical brighteners, such as sulphonated distylbenzene derivatives, and/or;
- dispersants, such as sodium polyacrylate or polyphosphates, and/or;
- insolubilizing agents, such as urea formol resin, melamine formol resin, glyoxal, epoxy resin, ammonium zirconium carbonate, and/or;
- lubricants, such as polyoxyethylene-glycols (PEG), calcium or ammonium stearate, dispersion of polyethylene, dispersion of paraffin and/or;
- antifoaming agents, and/or;
- biocides, such as formaldehyde, and/or;
- pigments, such as inorganic fillers called basic fillers (calcium carbonates, kaolinite, talc), or fillers called more specific (structured kaolinite, calcinated kaolinite, titanium dioxide, alumina hydrate, organic fillers), and/or;
- compounds adjusting the pH: DAP (diammonium phosphate), and/or;
- thickeners or water retention agents (polyvinyl alcohol, carboxymethylcellulose, starch, certain polymers, etc.), and/or;
- dyes and/or;
- antistatic agents and/or;
- colloidal silica modified or not.

Crosslinking agents may also be added to the coating composition, particularly epoxy silanes or agents based on zinc oxide (ZnO).

However, and as already stated, a composition according to the invention also integrates as few ingredients as possible, and at least water, the binding copolymer, the microspheres and optionally the fillers.

According to another aspect, the invention relates to the use of such an aqueous composition for producing, after coating, anti-blocking supports, free of blocking mechanisms, and the supports thereby obtained. The coating can be carried out on one or both sides of the said substrate.

It should be noted that in the aqueous composition according to the invention, the crosslinkable function is in non-crosslinked form. On the other hand, in the finished product (coated support), the said composition has given rise to a polymer film coating the expanded microspheres, and hence the polymer chains are crosslinked, thereby forming a three-dimensional network capable of inhibiting the blocking mechanism.

During the treatment of the support by the aqueous composition according to the invention, two successive reactions tale place:
- filmification of the layer;
- crosslinking of the latex particles.

Initially, the layer is formed after evaporation of the water in the composition, that is at about 90-100° C. Since the latex has a glass transition temperature Tg lower than 35° C., the microspheres can be dispersed optimally and begin to expand at this temperature, without the mechanism being too violent.

Then, the temperature rises, allowing both the expansion of the microspheres trapped in the film and the initiation of the crosslinking reaction between the chains of the binder. For this purpose, the temperature must be raised above 100° C. (between 100 and 120° C.).

Above 120° C., the condensation reaction forms stable chemical bonds between two polymer chains and between the functional groups of the substrate and of the layer.

In the case of the copolymer shown (see FIG. 1), the principle of the crosslinking of the binder resides in a condensation reaction by acidic catalysis between two methanol functions.

Figure 2:
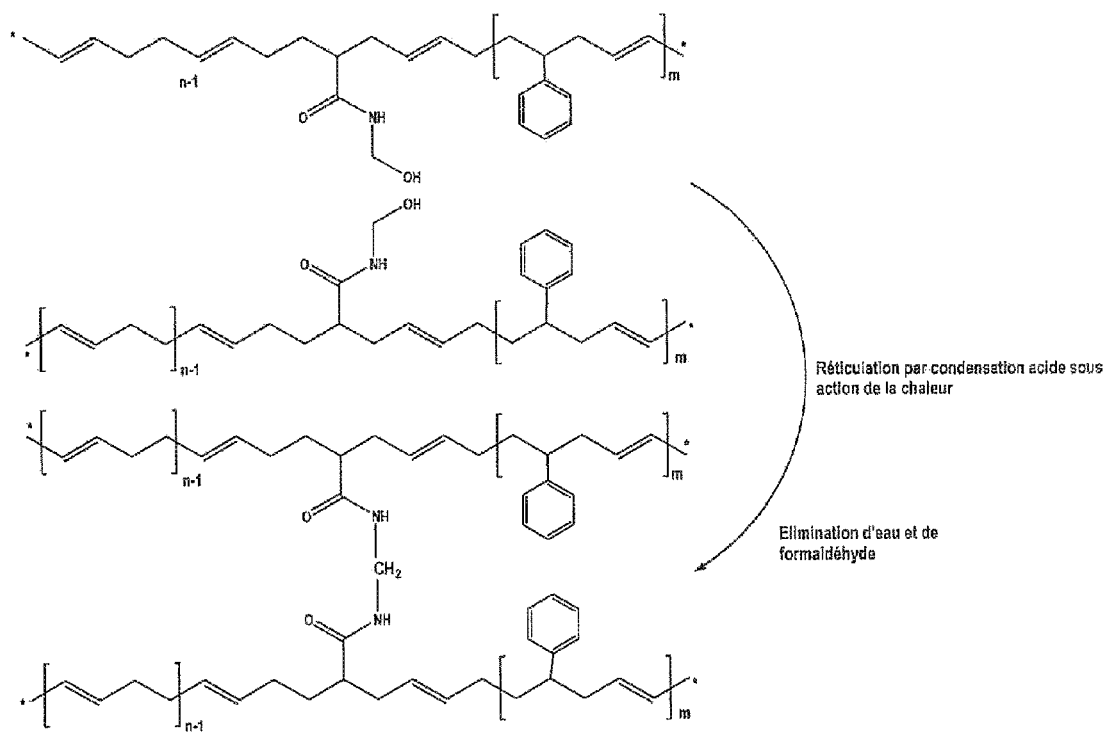
FIG. 2—Crosslinking by acidic condensation under the action of heat.

The diagram below shows the crosslinking mechanism. This crosslinking reaction induced by heating liberates water and formaldehyde to form a chemical bond (methylene bridge):

The diagram in FIG. 2 shows the crosslinking mechanism. This crosslinking reaction induced by heating liberates water and formaldehyde to form a chemical bond (methylene bridge).

The crosslinkable function, N-methylol, described in this example, implies a removal of the formaldehyde during the crosslinking. However, other comonomers exist, which do not liberate formaldehyde during the condensation.

Since this reaction is induced by acidic catalysis and one of the SBR systems have a basic pH, it is necessary to stabilize the reaction. For this purpose, a chemical compound is added (ammonium chloride, diammonium phosphate) or an ammoniacal compound is used to adjust the pH.

More generally, the invention therefore also relates to a method for preparing anti-blocking supports, free of blocking mechanisms, consisting in coating a support of the paper, cardboard, non-woven type, on at least one of its sides (advantageously both) using an aqueous composition as previously described.

More precisely, such a method comprises the following steps:
- coating the support;
- drying the support thereby obtained at a sufficient temperature to allow, on the one hand, the evaporation of the water present in the said composition, and on the other, the at least partial expansion of the microspheres, generally at a temperature close 100° C.;
- subjecting the support thereby obtained to conditions allowing the optimal expansion of the microspheres and the crosslinkage between the copolymer chains, for example at a temperature above 100° C.

As mentioned, it may be necessary to adjust the pH of the coating composition for the crosslinking reaction to take place.

In the context of the present invention, the function grafted on the copolymer acts under the action of the temperature (heat-sensitive terpolymer).

Another activation of crosslinking mode may be considered: humidity, radiation, etc. This requires the functionalization of the copolymer by a specific chemical group of the epoxy or acrylate type.

EXEMPLARY EMBODIMENT OF THE INVENTION

The invention and the advantages thereof will appear better from the following exemplary embodiment. However, this is only provided for illustration and is non-limiting.

Formulation:

|  | Proportion of various compounds in the coating solution (parts) |
|---|---|
| Water | 54 |
| Fillers | 11 |
| Binder | 20 |
| Microspheres | 15 |
| Additive | Small quantity |

Coating support: Liner test paper 105 g/m².
Binding Polymers:

Characterization of Coated Supports a) Stability of Coating Solution:

A sample of the coating solution is recovered in a transparent bottle and stored in the laboratory. The change over time is observed (settling or not) of the various components. This test is visual.

b) Appearance and Feel:

✓ Appearance:

This test is performed with the naked eye and combined with the visualization of the surface using an appropriate apparatus to observe the surface uniformity and the effective expansion of the microspheres.

✓ Feel:

This is a professional test, the personal assessment of the soft or rough feel of the coating.

c) Value of Anti-Blocking Coefficient:

Standard NF Q 03-083 is used to determine the static coefficient of friction by the inclined plane method.

The sample to be tested is pressed by an appropriate mass to a plane whereof the inclination is varied. When the skid is

TABLE 2

BINDING POLYMERS AND THEIR PROPERTIES

| No. | Supplier | | Binder type | Dry extract | pH | Viscosity (mPa·s) | Tg |
|---|---|---|---|---|---|---|---|
| 1 | Dow | DL 980 | Modified styrene-butadiene (SBRm) | 50 | 4.9 | 160 | −7 |
| 2 | Dow | DL 950 | Modified styrene-butadiene (SBRm) | 50 | 5.6 | 83 | 7 |
| 3 | Dow | DL 930 | Modified styrene-butadiene (SBRm) | 50 | 5.4 | 95 | 5 |
| 4 | Dow | DL 966 | Modified styrene-butadiene (SBRm) | 50 | 6.5 | 143 | 20 |
| 5 | Dow | XY 96452 | Modified styrene-butadiene (SBRm) | 50 | 6.3 | 409 | 20 |
| 6 | Dow | XY 96700 | Modified styrene-butadiene (SBRm) | 50 | 6.8 | 194 | |
| 7 | Dow | XY 96491 | Modified styrene-butadiene (SBRm) | 50 | 6.4 | 240 | 26 |
| 8 | Raisio Chemicals (Latexia France) | Latexia 302 | Carboxylated styrene-butadiene (SBRc) | 50 | 5.5 | 200 | 10 |
| 9 | Polimeri | 5581 | Styrene-butadiene (SBR) | 50 | 8.1 | 220 | 8 |
| 10 | Synthomer | 79Q10 | Carboxylated styrene-butadiene (SBRc) | 50 | 5.6 | 100/350 | 4 |
| 11 | Raisio Chemicals (Latexia France) | SB 088 | Carboxylated styrene-butadiene (SBRc) | 50 | 8 | 250 | 27 |
| | | SB 183 | Carboxylated styrene-butadiene | 50 | 4.5 | 150 | 0 |
| 12 | Rohm & Haas | P322AF | Styrene-acrylic (SA) | 50 | 7.5 | <150 | 22 |
| 13 | Rohm & Haas | P308M | Styrene-acrylic (SA) | 50 | 7 | <500 | 8 |
| 14 | Rohm & Haas Lehmann&Voss | P308M + Dinal PB 204 | Binder + Tg modifier | | | | |
| 15 | Rohm & Haas OSI Specialties | P308M + Epoxy silane | Binder + crosslinking agent | | | | |
| 16 | Synthomer | VL 10656* | Carboxylated styrene-acrylic-butadiene (SBRAc) | 50 | 8/9 | 50/500 | 5/10 |

*Crosslinking carboxylated SBR terpolymer no longer in equilibrium, a cell is used to stop the inclination of the plate and the value of the blocking angle is recorded. A measurement is taken at the first sliding.

d) Test for Blocking:

This is a test used to determine the capacity of two sheets positioned face to face of sticking to one another, with the purpose of ensuring that the two sheets do not stick under weight stresses and in rigorous storage conditions. The weight applied is 500 g/cm$^2$.

Storage is carried out in various conditions:
✓ 22° C./50% relative humidity;
✓ −18° C.;
✓ 50° C./90% relative humidity;

The storage time varies from one day to 6 months, or more for certain formulations.

Results:

TABLE 3

CHARACTERISTICS OF COATED SUPPORTS

| No. | | Sauce stability | Appearance and feel | Coef (°) | Blocking | | | |
|---|---|---|---|---|---|---|---|---|
| | | | | | 1 day | 1 week | 1 month | −6 months |
| 1 | DL 980 | No | 3 | 54 | 2 | 2 | 2 | 0 |
| 2 | DL 950 | No | 3 | 58 | 2 | 2 | 2 | 0 |
| 3 | DL 930 | No | 3 | 50 | 2 | 2 | 2 | 0 |
| 4 | DL 966 | No | 5 | 54 | 0 | 0 | 0 | 0 |
| 5 | XY 96452 | No | 5 | 51 | 2 | 2 | 2 | 0 |
| 6 | XY 96700 | No | 5 | 56 | 2 | 2 | 2 | 0 |
| 7 | XY 96491 | Yes | 5 | 55 | 5 | 5 | 2 | 0 |
| 8 | Latexia 302 | No | 5 | 53 | 0 | 0 | 0 | 0 |
| 9 | 5581 | No | 5 | 57 | 0 | 0 | 0 | 0 |
| 10 | 79Q10 | Yes | 3 | 59 | 5 | 5 | 2 | 0 |
| 11 | SB 088 SB 183 | Yes | 5 | 50 | 0 | 0 | 0 | 0 |
| 12 | P322AF | Yes | 5 | 59 | 5 | 5 | 2 | 0 |
| 13 | P308M | Yes | 5 | 48 | 0 | 0 | 0 | 0 |
| 14 | P308M + Dinal PB 204* | Yes | 5 | 40 | 5 | 2 | 2 | 0 |
| 15 | P308M + Epoxysilane** | Yes | 5 | 42 | 2 | 2 | 2 | 0 |
| 16 | VL 10656 | Yes | 5 | 59 | 5 | 5 | 5 | 5 |

*Tg modifier
**Crosslinking agent
Grade 5: best
Grade 0: worst

Conclusions:

It is found that for the fabrication of anti-blocking supports, the most effective binders, producing a good surface appearance, a good feel without powdering and a good static coefficient of friction, are those consisting of a copolymer having a low glass transition temperature Tg, of between −10° C. and 30° C. However, these conventional latexes and their formulation cause blocking (accidental adhesion) (products Nos. 1 to 13 in Table 3).

As already described, it is found that the addition of additives (inorganic, organic fillers, crosslinking agents, glass transition temperature Tg modifiers) serves to limit the blocking mechanism, but without completely solving the problem (products Nos. 14 and 15 in Table 3).

The only binder yielding satisfactory results both in terms of sauce stability, appearance and feel of the finished product, anti-blocking coefficient, and blocking mechanism, is the one prepared from carboxylated heat-sensitive styrene-butadiene terpolymers. This terpolymer is obtained by the introduction of an acrylamide comonomer functionalized by an alcohol group (product No. 16 in Table 3).

The creation of this three-dimensional network serves to prevent:
 the interpenetration of the layers facing one another due to a mechanical stress (pressure);
 oxidative aging by splitting of the coating chains under the action of light and heat.

Furthermore, this three-dimensional network serves to produce an effective trapping of the microspheres in the coating, hence:
 optimal effectiveness of the anti-blocking properties;
 limited powdering;
 limited pullout of the microspheres from the coating (and therefore the possibility of avoiding the introduction of an excessive proportion of expansible microspheres).

These characteristics are lasting thanks to the irreversible nature of the three-dimensional network thereby created.

The formulation requires no additive apart from a rheological agent of the carboxymethylcellulose type, a pH adjusting compound and fillers to have anti-blocking properties with a good feel.

A formulation with a limited number of components accordingly avoids any problem of interaction and undesirable reactions between the components.

A formulation having a limited number of components is thus more stable and limits the risks of variation in the desired properties.

The invention claimed is:

1. Aqueous composition for coating supports to provide same with anti-blocking properties, comprising:
   (a) 50 to 99 parts by weight of a binding polymer; and
   (b) 1 to 50 parts by weight of expansible microspheres, wherein the binding polymer is a terpolymer of butadiene, styrene, and N-methylolacrylamide, said terpolymer having a glass transition temperature (Tg) between −10° C. and 35° C.

2. Aqueous composition according to claim 1, wherein said composition further comprises a crosslinking agent.

3. Aqueous composition according to claim 2, wherein said crosslinking agent is selected from the group consisting of an epoxy silane and an agent based on zinc oxide (ZnO).

4. Aqueous composition according to claim 1, wherein said composition further comprises:
   (a) pigments and/or;
   (b) thickeners or water retention agents and/or;
   (c) dyes and/or;
   (d) antistatic agents and/or;
   (e) optical brighteners and/or;
   (f) dispersants and/or;
   (g) insolubilizing agents and/or;
   (h) lubricants and/or;
   (i) antifoaming agents and/or;
   (j) biocides and/or;
   (k) colloidal silica modified or not.

5. Aqueous composition according to claim 1, wherein the composition is configured for preventing blocking mechanisms affecting anti-blocking supports.

6. Method for preparing anti-blocking supports, free of blocking mechanisms, comprising coating a paper, cardboard, or non-woven support on at least one of its sides using an aqueous composition according to claim 1.

7. Method for preparing anti-blocking supports according to claim 6, comprising:
   (a) coating the support;
   (b) drying the support thereby obtained at a sufficient temperature to allow evaporation of the water present in the said composition, and at least partial expansion of the microspheres; and
   (c) subjecting the support thereby obtained to conditions allowing the optimal expansion of the microspheres and the crosslinkage in the terpolymer.

8. Method for preparing anti-blocking supports according to claim 7, wherein the crosslinking in the terpolymer is obtained by a condensation reaction.

9. Method according to claim 6 wherein the paper, cardboard, or nonwoven support is coated on both of its sides.

10. Aqueous composition according to claim 1, wherein the terpolymer has a glass transition temperature Tg between −10° C. and 30° C.

11. Aqueous composition according to claim 1, said composition further comprising a chemical compound capable of adjusting the pH of said composition.

12. Method for preparing anti-blocking supports, free of blocking mechanisms, comprising coating a paper or cardboard support on at least one of its sides using an aqueous composition according to claim 11.

13. Method for preparing anti-blocking supports according to claim 12, comprising:
   (a) coating the support;
   (b) drying the support thereby obtained at a sufficient temperature to allow evaporation of the water present in the said composition, and at least partial expansion of the microspheres; and
   (c) subjecting the support thereby obtained to conditions allowing the optimal expansion of the microspheres and the crosslinkage in the terpolymer.

* * * * *